Feb. 7, 1961 W. E. STILWELL, JR 2,971,143
LAUNDRY APPLIANCE MOTOR CONTROL
Filed Jan. 18, 1957
2 Sheets-Sheet 1
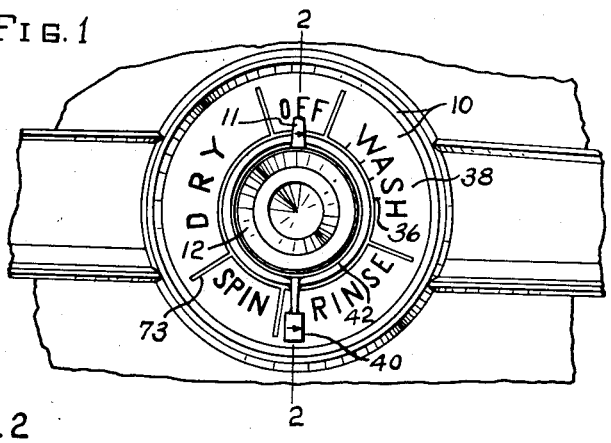
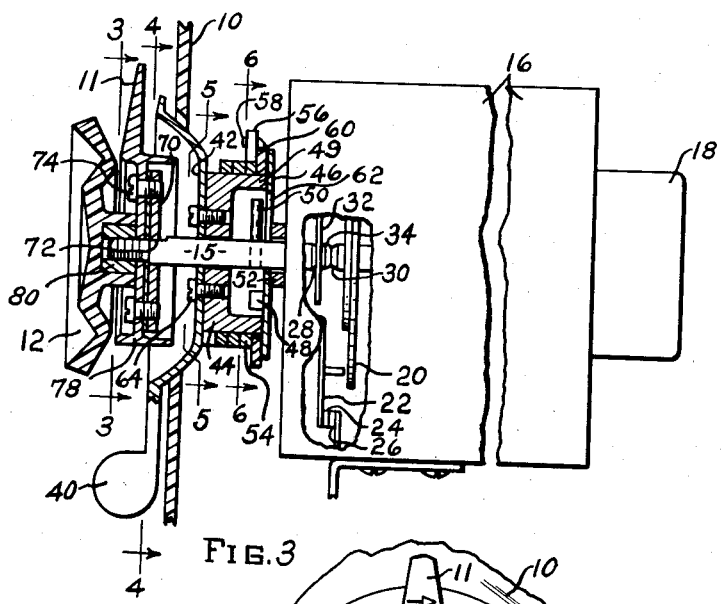
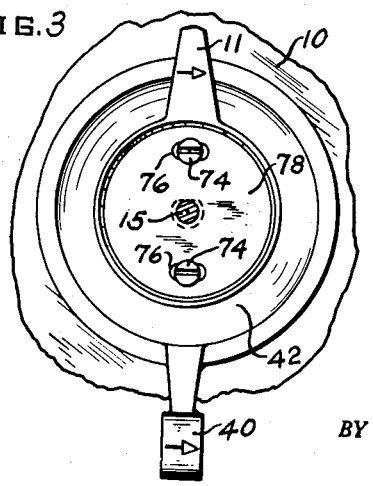
INVENTOR.
WILLIAM E. STILWELL JR.
BY
ATTORNEY Feb. 7, 1961 W. E. STILWELL, JR 2,971,143
LAUNDRY APPLIANCE MOTOR CONTROL
Filed Jan. 18, 1957 2 Sheets-Sheet 2
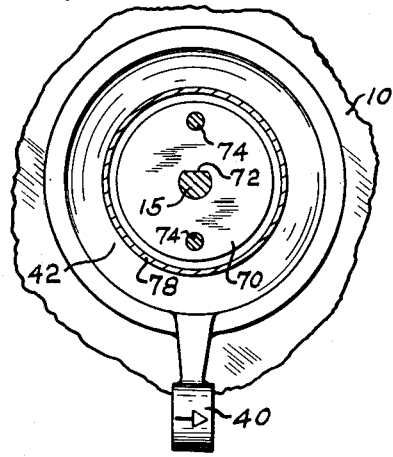
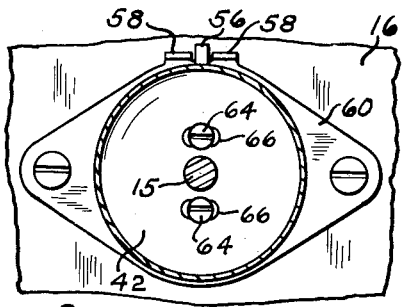
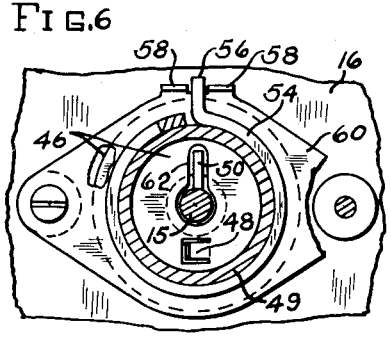
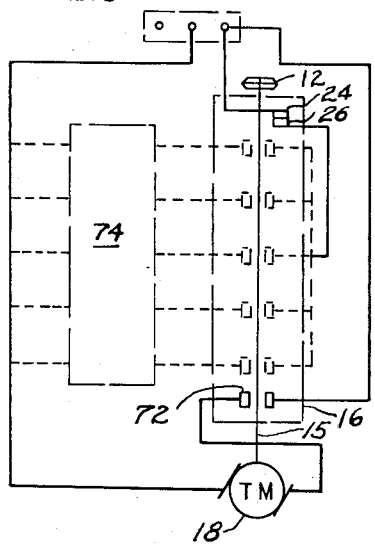
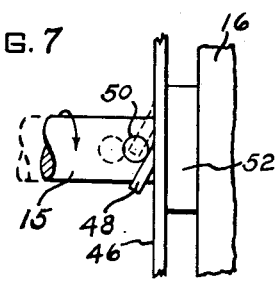

United States Patent Office 2,971,143
Patented Feb. 7, 1961

2,971,143

LAUNDRY APPLIANCE MOTOR CONTROL

William E. Stilwell, Jr., Glendale, Ohio, assignor to The Murray Corporation of America, Syracuse, N.Y., a corporation of Delaware Filed Jan. 18, 1957, Ser. No. 635,037

4 Claims. (Cl. 318—466)

This invention relates to laundry appliance controls, and more particularly to a control adapted to an automatic appliance which proceeds through a series of steps forming a cycle of operations, and wherein it is desirable to cause the appliance to stop after completing a preselected portion of the cycle.

In combination washing and drying machines, for example, it is desirable to cause the machine to stop after washing, or after completion of a part of the drying step in accordance with the wishes of the operator. It is also desirable to permit the operator to determine at what stage the cycle is to be stopped at the time the cycle is initiated.

The present invention is directed to a control in which an operator may determine in advance whether all or a part of a wash cycle, or washer dryer cycle is to be performed. The invention is further directed to a manually settable control acting through the timer to cause the timer to interrupt operations at a preselected state.

Further, the invention has provision for stopping the washing cycle independently of the timer motor control circuit, so that in any event the timer and its manual control will be returned to the start, or full cycle off position, ready for the start of a new cycle. In addition, provision is made to assure operation of the controls in a proper manner, so as to avoid undesired results in the manual setting of the controls.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a front elevational view of the control;

Figure 2 is a sectional view taken substantially on the line 2—2 of Figure 1;

Figure 3 is a transverse sectional view taken substantially on the line 3—3 of Figure 2;

Figure 4 is a transverse sectional view taken substantially on the line 4—4 of Figure 2;

Figure 5 is a transverse sectional view taken substantially on the line 5—5 of Figure 2;

Figure 6 is a transverse sectional view taken substantially on the line 6—6 of Figure 2;

Figure 7 is a fragmentary side elevation of the camming mechanism, showing the cam moved instead of the shaft rotated, for clarity; and Figure 8 is a circuit diagram in which the control may be used.

Referring to Figures 1 and 2 there is shown a fixed dial 10, having sectors indicating intervals of time for washing, rinsing, centrifuging (spin) and drying, and a pointer 11 and knob 12 for setting the timer for any desired wash period, in reference to the dial. The knob and pointer are affixed to the shaft 15 of a timer 16 of the type generally shown in Hall Patents Nos. 2,227,133 and 2,313,064, issued Dec. 31, 1940, and March 9, 1943, respectively. In such a timer, the timer cams are advanced step by step by clock actuation, and may be manually advanced at will by similar clockwise rotation, as viewed in Figure 1, so as to shorten the overall length of the operating cycle, there being provided an overrunning clutch connection to the timer drive or clock motor 18. The timer shaft is also movable axially by manipulation of the knob, to complete or break a circuit supplying the energy for the entire appliance, or if desired all of the circuits thereof, except the timer motor. In both cases, one of the timer cams maintains a circuit to the timer motor through the entire washing and drying cycle, breaking the circuit when the cam shaft reaches the "off" position. When such position is reached, the timer motor circuit is opened. The remaining cams also provide for open circuits at this time. The circuits controlled by the remaining cams, however, may, as shown in Figure 8, be supplied with power separately through the contacts 24, 26 of the timer, which contacts are opened or closed by the axial shifting of the timer shaft, either manually, or by cam action, as will herein appear.

For this purpose the shaft has affixed to it, a flat disc 20, which is adapted to bear upon the contact finger 22, to open the contacts 24 and 26, when the shaft is moved to the left of the position shown in Figure 2. The disc 20 may be one of the cam discs of the timer. The shaft is provided with two annular grooves 28 and 30, into either one of which is urged a spring arm or hairpin spring 32, the arm being fixed at one end to the timer casing. When the shaft is moved axially to the left manually, or otherwise from the position shown in Figure 2, the spring arm is caused to ride over the ridge 34 between the grooves, and seat in the groove 30, to hold the shaft in the pulled out position, and when the shaft is returned to the operating position shown, such arm lies in groove 28 to hold the shaft in such position. When in the "pulled out" position, with the groove 30 moved to the left, to engage the spring arm, the contacts 24 and 26 are held open, thus opening the master circuit to the appliance.

The dial 10 is provided with graduations or indicia 36 in the wash sector 38, so that by manually rotating the knob 12 and indicator 11 clockwise, and aligning the pointer with one of said graduations, the washing or other operation can be started in advance of the normal starting position, to provide a shortened wash period as desired. The knob is normally in out position during setting or selecting the wash period length, after which it is moved axially inward, or to the right to the position shown in Figure 2, to close contacts 24 and 26 and start the timer and laundry cycle.

In an automatic laundry appliance such as a washing machine and particularly a combination washing and drying machine it is often desirable to terminate the automatic cycle of operations prior to termination of a complete automatic cycle. For example, should it be desired to merely wash and rinse it would be desirable to provide means for stopping the mechanism at the end of the rinse portion of the cycle. On the other hand, if it is desired to damp dry the laundry but not complete the drying operation, then it would be desirable to stop the operation at the end of the centrifugal extractor or spin portion of the cycle. On the other hand, it may be desirable to dry the fabrics up to a certain stage whereupon the complete drying portion of the cycle would not be desired. In such a case, it would be desirable to operate the automatic cycle through a selected portion of the dry cycle and then have the apparatus automatically stop. It will be appreciated that the apparatus can be stopped manually at any time by merely manually moving the timer cam shaft outward, or to the left, thereby opening the contacts 24 and 26, but such operation would require attendance by the operator at the time the cycle is to be discontinued.

In order to make it possible for an operator to preselect the extent of the wash and dry cycle desired to be utilized for a particular laundry load there is provided a settable automatic stop comprising a lever arm 40. Such lever arm is shown in the form of an extension upon a recessed dished hub 42 lying behind the knob and pointer. The recessed hub is affixed to a hollow drum 44 mounted for free rotation upon the shaft 15. The drum has affixed to its back wall a disc 46, such disc being welded or otherwise secured to the annular edge 49 of the drum. The disc as is shown, particularly in Figures 6 and 7, has an inclined cam finger 48 struck inwardly therefrom. The shaft 15 is provided with a radial pin 50 which is adapted, upon rotation, to engage the cam finger 48. The drum 44 is held on the shaft in the proper position against rearward thrust by a thrust washer 52 bearing against the casing of the timer 16.

To prevent rotation of the drum 44 in a clockwise direction, a self wrapping coil spring brake 54 is positioned on the external drum surface and a radial end thereof 56 is held against rotation between fingers 58 of a plate 60 which is affixed to the timer casing. Thus the drum may be freely rotated counter-clockwise, but is held against opposite rotation. It will be seen that by setting the lever 40 at any selected position by rotating in a counter-clockwise direction the cam finger 48 may be advanced so as to engage the pin 50 after the elapse of a selected period of time. When the pin 50 engages the cam, the shaft 16 is moved from the position shown in Figure 2 to the left so that the spring arm is caused to shift from the groove 28 to the groove 30. The disc 20 engages the contact finger 22 to open the contacts 24 and 26 and stop the operation.

The cam finger 48, as shown in Figure 7, is of such a length as to cause the shaft 15 to shift to the pulled out position, as the pin 50 engages the cam. Once the "pulled out" position is established, the pin clears the cam, and the drum can be rotated counter-clockwise for resetting, and the knob and pointer may be rotated to any position without interference from the cam 48 controlled by the lever 40.

When the pin 50 engages the cam 48, the torque is transmitted to the drum 44, which tends to rotate the drum clockwise. Such rotation is prevented by the self wrapping, prehensile, characteristics of the brake coil 54, so that such brake performs the dual function of preventing manual setting of the lever 40 in any direction other than counter-clockwise direction, and resists the clockwise torque of the cam.

The disc 46 is provided with a radial slot 62 to permit assembly of the pin 50 within the cavity of the drum 44, and the drum 44 as affixed to the hub 42 by screws 64 extending through arcuate slots 66 which permit a limited adjustment.

The dial pointer 11 is affixed to a plate 70 having a D-shaped opening which cooperates with a flat 72 on the shaft 15 to key the plate to the shaft. The pointer is secured to the plate 70 by screws 74 extending through arcuate slots 76 in the pointer hub 78 so that the pointer may be adjusted for proper indexing. The knob 12 is provided with a threaded bushing 80 which is threaded on the end of the shaft 15, a right hand thread being provided so that as the knob is turned clockwise it will tighten its threaded engagement with the shaft. Such thread permits the knob to unscrew upon any attempt to rotate the timer in a counter-clockwise direction.

It will thus be seen, that by setting the lever at the position shown in Figure 1, that the cam 48 will engage the pin 50 after the pointer 11 is advanced to near the end of the "Rinse" sector. The camming operation will thus act to open contacts 24 and 26, when the end of the rinse cycle is reached. If drying through about half of the drying period is desired, the lever 40 will be rotated counter-clockwise about 250° from the position shown in Figure 1. The cam 48 will then engage the pin 50 as the middle of the dry period is reached and thus cut off the operation of the appliance. If damp dry clothes are desired, as is obtained from centrifugal drying, or spinning, the lever 40 is advanced around the dial counter-clockwise to the division 73 between the spin and dry segments. The appliance will then be stopped when centrifugal drying has been completed.

Any attempt to set the knob and pointer, which involves passage of the pin 50 over the cam 48, will of course shift the shaft to the off position, if it is not already in such position. This is desirable since it is preferable to set the pointer, before starting the cycle with the contacts 24 and 26 open.

The arrangement thus far described, when the contacts 22 and 24 are in circuit with the main supply of power to both the timer motor as well as the timer controlled circuits, will stop the timer when the preset stopping point is reached, leaving the knob 12 and pointer 11 at the position it was when the cycle was interrupted. This requires the operator to subsequently rotate the knob to the off position, before initiating a further wash cycle. Should the operator shift the shaft axially before rotating to the off position, circuits in the remaining portion of the cycle would be established, for no useful purpose.

To avoid such possibility, the contacts 24 and 26 may be used to interrupt the supply of power to all circuits except the timer motor circuit. In that case the timer motor will continue to advance the timer to the off position, so that it will be ready for the next cycle. Diagrammatically shown in Figure 8 are the essentials of a circuit for this purpose. There is shown a terminal block having a connection to the timer motor 18 through the timer cam controlled contacts 172. The contacts 24 and 26 are in a separate circuit leading to the other cam controlled contacts, circuits and various mechanisms controlled thereby as is indicated by the box 74. Thus opening of the contacts 24 and 26 stops the washer dryer cycle, while the cam shaft and cam controlled contacts 172 are allowed to continue by timer motor drive, until the off position is reached at the end of the cycle, when the timer shaft motor cam operates to open cam contacts 172 to open the timer motor circuit.

Such arrangement thus brings the cam shaft around to the off position. At the same time, such action does not prevent the operator from subsequently advancing the pointer into the drier cycle if desired, if the machine is to be used for drying only or to finish drying a load that was left in the machine and with respect to which the cycle was cut off before completion by election of the operator.

It will be seen that any single operation can be started and automatically stopped after a preset time, merely by setting the knob, and lever in an appropriate manner, and that by limiting the rotation directions of the knob 12 and lever 40 so that they turn only in opposite directions, the operation of starting the cycle at a selected point, and terminating the operation at another point, is readily effected by rotating the knob and lever relatively toward one another until the part of the cycle desired is suitably embraced therebetween as indicated by the selected arc of the dial. Starting of the selected portion of the cycle is then effected by shifting the knob inwardly axially to start the mechanism. With the circuit shown in Figure 8, the knob and timer cams are always returned to the off position, regardless of what part of the cycle of operation is employed. Further manual reset of the lever 40, or advance of the knob 12 always results, when finger 48 is caused to engage pin 50 in axially shifting of the shaft outward, so that setting is effected therebeyond with contacts 24 and 26 open. Such contacts are thereafter closed only by manually shifting of the shaft axially inward.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a laundry appliance control, a motor driven timer having an axially shiftable shaft rotated by the timer motor in one direction, a switch actuated by axial movement of the shaft, a plate having a cam mounted on the shaft and rotatable with respect thereto, and a cam follower affixed to the shaft, said cam and cam follower being adapted to axially shift said shaft on rotary engagement of said follower with the cam, manual means for setting the cam plate, and means for preventing rotation of said plate in the direction of rotation of said cam shaft.

2. In a laundry appliance control, a motor driven timer having an axially shiftable shaft rotated by the timer motor in one direction, a switch actuated by axial movement of the shaft, a plate having a cam mounted on the shaft and rotatable with respect thereto, and a cam follower affixed to the shaft, said cam and cam follower being adapted to axially shift said shaft on rotary engagement of said follower with the cam, manual means for setting the cam plate, a drum attached to said plate, and a helical friction spring frictionally munted on said drum, and having an end fixed against rotation, whereby to resist rotation of said drum in the direction of rotation of said shaft.

3. In a laundry appliance control, a motor, a timer having a shaft rotated by said motor in one direction, said timer being adapted on a complete rotation of said shaft to establish an off position and a cycle of operation including various successive steps, a switch for discontinuing the operation of said cycle at any desired stage to eliminate a terminal portion of the cycle, means for actuating said switch from the rotation of said shaft, manually settable means for said last named means for determining the stage of discontinuing the operation of the cycle, and a timer cam actuated switch means in circuit with said timer motor, for continuing the operation of said timer to the off position.

4. In a laundry appliance control, a motor, a timer having a shaft rotated by said motor in one direction and axially shiftable, said timer being adapted on a complete rotation of said shaft to establish an off position and a cycle of operation including various successive steps, a switch operable on axially shifting of said shaft for discontinuing the operation of said cycle at any desired stage, means for actuating said switch from the rotation of said shaft including manually settable means for determining the stage of discontinuing the operation of the cycle, and timer cam actuated switch means in circuit with said motor for continuing the operation of said timer to the off position.

References Cited in the file of this patent
UNITED STATES PATENTS

| | | |
|---|---|---|
| 1,820,252 | Shippy | Aug. 25, 1931 |
| 1,828,126 | Brown | Oct. 20, 1931 |
| 1,940,549 | Jones | Dec. 19, 1933 |
| 2,352,156 | Anderson | June 27, 1944 |
| 2,527,249 | Gallagher | Oct. 24, 1950 |
| 2,540,723 | Geldhof | Feb. 6, 1951 |
| 2,549,025 | Sisson | Apr. 17, 1951 |